United States Patent
Wang et al.

(10) Patent No.: US 10,498,523 B1
(45) Date of Patent: Dec. 3, 2019

(54) MULTIPATH CLOCK AND DATA RECOVERY

(71) Applicant: Diodes Incorporated, Milpitas, CA (US)

(72) Inventors: Jin-sheng Wang, Cupertino, CA (US); Kai Hung Yu, San Jose, CA (US)

(73) Assignee: Diodes Incorporated, Milpitas, CA (US)

( * ) Notice: Subject to any disclaimer, the term of this patent is extended or adjusted under 35 U.S.C. 154(b) by 0 days.

(21) Appl. No.: 16/170,856

(22) Filed: Oct. 25, 2018

(51) Int. Cl.
*H04L 7/00* (2006.01)

(52) U.S. Cl.
CPC .......... *H04L 7/0008* (2013.01); *H04L 7/0079* (2013.01)

(58) Field of Classification Search
CPC .......................... H04L 7/0008; H04L 7/0079
See application file for complete search history.

(56) References Cited

U.S. PATENT DOCUMENTS

| | | | | |
|---|---|---|---|---|
| 6,915,078 B1* | 7/2005 | Mazzurco | .......... | H04Q 11/0005 370/471 |
| 6,934,305 B1* | 8/2005 | Duschatko | ............ | H04L 45/583 370/503 |
| 6,982,974 B1* | 1/2006 | Saleh | ................... | H04L 49/1515 340/2.2 |
| 7,068,663 B1* | 6/2006 | Adler | ..................... | H04J 3/1611 370/392 |
| 7,440,512 B2* | 10/2008 | Preisach | ................ | H04B 10/29 375/232 |

OTHER PUBLICATIONS

Inphi Corporation, "IN012525-SF 10/25/28G Single Channel Bidirectional CDR for Module Applications" https://www.inphi.com/portal/products/in012525-sf.php, 2011-2014.

Texas Instruments, "LMH0397 3G-SDI Bidirectional I/O With Integrated Reclocker" http://www.ti.com/product/LMH0397/support, Apr. 2017.

Microsemi, "VSC8228 Dual Channel Multirate Signal Conditioner and Retimer" https://www.microsemi.com/product-directory/signal-conditioners/4009-vsc8228#resources, May 31, 2016.

* cited by examiner

*Primary Examiner* — Freshteh N Aghdam

(74) *Attorney, Agent, or Firm* — Weaver Austin Villeneuve & Sampson LLP (57) ABSTRACT

Multipath clock and data recovery circuits and multipath I/O devices are described that operate to provide flexible I/O paths for serial data communications. Active unidirectional components such as a clock and data recovery circuit may be used to implement different I/O paths. Bandwidth and signal degradation for high-speed serial data transmission is reduced.

22 Claims, 6 Drawing Sheets

MULTIPATH CLOCK AND DATA RECOVERY

BACKGROUND

Protocols for transmitting high-speed serial data between devices are constantly in the process of being revised with new and improved versions. Examples of such protocols include the DisplayPort standard, the High-Definition Multimedia Interface (HDMI) standard, the Serial ATA standard, the Peripheral Component Interconnect Express (PCI-E) standard, and the Universal Serial Bus (USB) standard. However, such protocols often use input/output (I/O) paths with physical layer interfaces that dedicate specific I/O pins as inputs or outputs. Such specificity in I/O pin functionality increases deployment costs. For example, data centers with dense server deployments require complex cable routing due to geometrical constraints arising from fixed I/O pin layouts. Moreover, the fixed nature of I/O pin functionality can result in misallocation of upload or download throughput resources, since a particular physical channel (e.g., an upload channel) for an I/O pin cannot be used for a different purpose (e.g., as a download channel) in response to changing data traffic patterns.

Figure 1A:
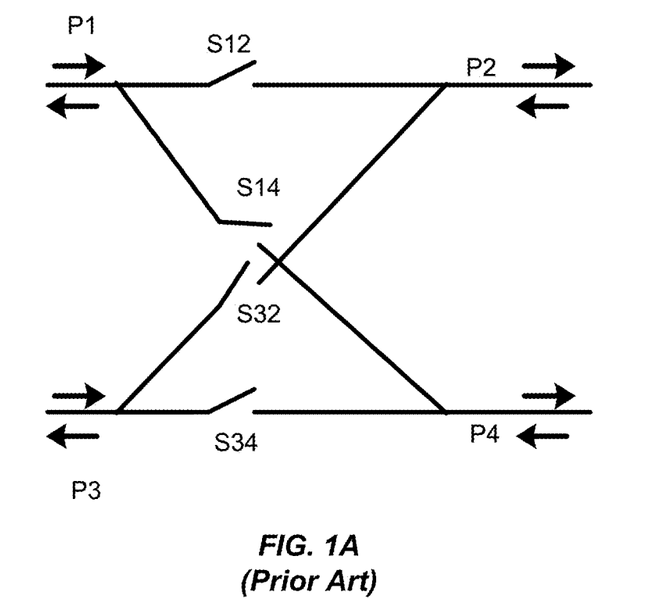
FIGS. 1A-B are simplified block diagrams of matrix switches.

Despite the evolution of such data communication protocols having yielded significant improvements in features such as data rates, there has been less significant advancement in I/O path flexibility. Conventional approaches to improving I/O path flexibility are associated with increased challenges for circuit designs for high-speed serial communications. For example, a conventional circuit design for increasing I/O path flexibility is a matrix of passive switches ("passive matrix switch"). As depicted in FIG. 1A, an example passive matrix switch design having four ports (P1-P4) includes four passive switch components, S12, S14, S32, and S34. Each of these passive switches allows signals to propagate in either direction between the enumerated ports. Unfortunately, the passive components in the passive matrix switch and/or channel cause signal bandwidth limitations and insertion losses that result in signal degradation unacceptable for high-speed serial communications.

Figure 1B:
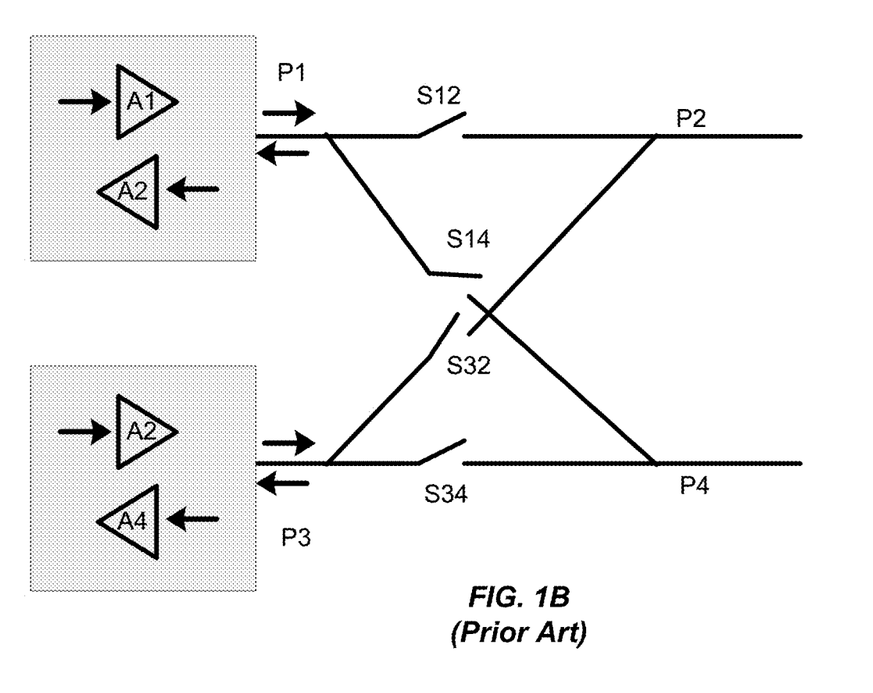

Referring to FIG. 1B, in some conventional approaches to increasing I/O path flexibility, active components A1-A4 controlled by a digital state machine (not shown) are combined with a passive matrix switch to compensate for the signal degradation caused by the passive components. Such a combination of active components and a passive matrix switch is referred to herein as an "active matrix switch." Unfortunately, the active components are unidirectional, in contrast to the bidirectional passive components. As a consequence, a conventional active matrix switch has two unidirectional active components interfaced to a passive switch (e.g., A1 and A2 are each coupled to switch S12), one dedicated for upstream traffic, and the other dedicated to downstream traffic. It should be appreciated that in certain applications, dedicated circuitry is balanced equally between upstream traffic and downstream traffic, but the amount of actual data traffic (e.g., data payload) can be heavier in one direction relative to another direction. For example, the downstream traffic can be higher than upstream traffic.

While a conventional active matrix switch helps to address the signal degradation caused by the passive components and/or channel, the parallel upstream and downstream branches contain redundant (i.e., duplicative) circuitry. For instance, for the example passive matrix switch design having four ports (P1-P4), four sets of circuitry having identical components are necessary (e.g., two sets to handle the paths from P1→2,4 and P3→2,4, and two sets to handle the paths from P2→1,3, and P4→1,3). Such redundancy is inefficient in terms of power and semiconductor die area usage, thereby limiting the ability of the conventional active matrix switch to meet the practical needs of circuits requiring I/O path flexibility.

An example deployment of a half-duplex signal repeater will be instructive. The signal conditioning performed by a signal repeater is a critical task in serial communication systems. Repeaters are used in a wide range of applications, including redrivers and retimers. One objective of repeaters is to regenerate signals to boost the signal quality of high-speed interfaces. Repeaters are a key technology for addressing the signal integrity challenges that higher data rates introduce across every industry and serial data protocol.

In an example deployment of a half-duplex signal repeater, such as in a hub device with signal regeneration capabilities, in the upstream path, the initial active component can be a Continuous Time Linear Equalizer (CTLE) to correct for losses and distortions caused by high frequency transmission lines and/or compensate for the insertion loss caused by the channel. This can be followed by, for example, a decision feedback equalizer (DFE) that uses feedback of detected symbols to produce an estimate of the channel output. For example, the intersymbol interference (ISI) can be directly subtracted from the feedback of detected symbols via a feedback finite impulse response (FIR) filter. The DFE can be followed by, for example, a unidirectional clock and data recovery (CDR) circuit for extracting timing information from a serial data stream to allow the receiving circuit to decode the transmitted symbols, which is necessary to generate a high fidelity replica of the received signal, thereby recovering the clock and data from the serial data stream. The unidirectional CDR can be followed by, for example, a driver circuit matched to the characteristics of a subsequent circuit stage, such as a USB 3.0 compliant cable connected to a host device. Continuing the example, in the downstream path, the initial active component receiving signals from the host device is a second CTLE, followed by another DFE, unidirectional CDR, and driver for driving a signal on a USB 3.0 compliant cable connected to a destination slave device.

It should be appreciated that, despite the increased flexibility of such a half-duplex signal repeater, there are still duplicates of circuitry such as the unidirectional CDR circuits. Such redundancy results in power consumption and semiconductor die area penalties. It should further be appreciated that that the scale of the penalties increases based on the number of I/O paths. For example, in a hub device with n slave ports, there is redundant circuitry for each of these ports, and therefore the power and area penalty is multiplied by n.

Such penalties in power and area can be substantial, even when n equals one. For example, to support the high data rates, communication circuits must satisfy stringent performance specifications, such as low bit error rates (BERs), which require unidirectional CDRs with low jitter components. Thus, unidirectional CDRs that support high-speed serial communications standards are often large and power-hungry circuits, as they typically include a main CDR loop and a multiphase generator circuit having a phase locked loop (PLL) or a delay-locked loop (DLL). As an example, a unidirectional CDR that supports high-speed serial communication standards can be large and power hungry because of the on chip loop filter and high frequency voltage control oscillator. The multiphase generator outputs multiple, phase separated signals approximating the incoming data rate and feeds them to the main CDR loop. Multiple phase detectors are used to detect the sign of the phase error, which is used to control the phase of the recovered clock signal in order to center the main CDR loop on the input data eye. In certain architectures, a high speed clock from the voltage control oscillator will feed the phase detector and compare the incoming data to produce early/late signals. These early/late signals are used to control the voltage control oscillator frequency so as to synchronize with the incoming data.

The design of unidirectional CDRs for high-speed serial communications is complicated by conflicting tradeoffs between linearity, noise sensitivity, operating voltage range, area, and power. For example, the loop filter's capacitance usually consumes the largest area due to capacitance density and/or leakage concerns. It should be appreciated that the leakage can be higher due to, for example, an increase in the number of devices being connected to the unidirectional CDR. The loop filter capacitance, when implemented on chip, consumes a large area, such as, for example, 50% or more of the die area for a retimer circuit. In additional to being large, the unidirectional CDR is also power-hungry due to, at least in part, the at-speed phase detectors and at-speed voltage controlled oscillator.

Conventional repeater (e.g., retimer, reclocker) designs with unidirectional CDR circuitry are not designed to be interfaced to a passive matrix switch in a manner that provides a power and size efficient active matrix switch.

One commercially available repeater circuit implements separate upstream and downstream channels and is described as having applications in bidirectional signal conditioning. The bidirectionality refers to a dual channel circuit, one channel being dedicated to transmit, and the other channel being dedicated to receive, with each channel having its own unidirectional CDR. Another example of a repeater circuit with separate upstream and downstream channels is described as a single channel bidirectional CDR. The repeater circuit is designed for the small form factor package (SFP28) physical interface, which is a full-duplex interface with simultaneous transmit and receive, such as through separate copper or fiber cables, or through a single fiber cable using wavelength division multiplexing. The single-channel refers to a full-duplex transmit/receive pair, therefore the bidirectional CDR of the repeater circuit refers to a dual channel circuit, one channel being dedicated to transmit, and the other channel being dedicated to receive, with each channel having its own unidirectional CDR. The circuit designs for the above two examples have two unidirectional CDRs, two output ports, two input ports, and no I/O ports, therefore the circuit designs are not intended to be interfaced to a passive matrix switch to provide a power and size efficient active matrix switch.

A different commercially available repeater circuit reduces the redundancy in active components, such as unidirectional CDRs, in upstream and downstream channels, and is described in the datasheet as a bidirectional I/O with integrated reclocker. However, the bidirectional I/O is limited to a single I/O port, the SDI_IO± port (for the purposes of the present disclosure, both a single ended I/O and a differential I/O interface are referred to as a single I/O). There is no second I/O port because the 100 ohm driver and PCB EQ active components have dedicated transmit and receive ports, respectively. In fact, the 100 ohm loopback output mode described in the feature list of the datasheet allows the 100 ohm driver and PCB EQ to propagate signals simultaneously, therefore the two active components would not be coupled to a shared physical channel to form an I/O port, as is illustrated for Cable EQ and Cable Driver active components coupled to the 75 ohm termination network. The 100 ohm driver and PCB EQ would not be configured to share a physical channel as that would increase the loading on a subsequent circuit stage, such as on the PCB, due to the PCB traces leading to the 100 ohm driver and PCB EQ active components. The circuit has one unidirectional CDR, two output ports, one input port, and one I/O port, and therefore the circuit is not designed to be interfaced to a passive matrix switch to provide a power and size efficient active matrix switch.

SUMMARY

According to a first class of implementations, a circuit includes: a first input/output (I/O) port coupled to first transmit circuitry and first receive circuitry. The circuit also includes a second I/O port coupled to second transmit circuitry and second receive circuitry. The circuit also includes a first unidirectional clock and data recovery (CDR) circuit that includes: a first receive port configured to receive a first received signal conforming to a serial data protocol, a first transmit port configured to transmit a recovered data signal generated from the first received signal using a recovered clock signal generated from the first received signal. The circuit also includes first multipath circuitry configured to selectively couple the first unidirectional CDR circuit to the first transmit circuitry and the first receive circuitry or the second transmit circuitry and the second receive circuitry. Implementations of the described techniques may include hardware, a method or process, or computer software on a computer-accessible medium.

Implementations within the first class of implementations may include one or more of the following features. The first multipath circuitry may further include: first signal selection circuitry configured to selectively couple the first transmit port to an input of the first transmit circuitry or an input of the second transmit circuitry. The circuit may also include second signal selection circuitry configured to selectively couple the first receive port to an output of the first receive circuitry or an output of the second receive circuitry. The circuit may also include first control circuitry configured to control the first signal selection circuitry for selective coupling of the first transmit port to the input of the first transmit circuitry or the input of the second transmit circuitry, or to control the second signal selection circuitry for selective coupling of the first receive port to the output of the first receive circuitry or the output of the second receive circuitry. The first unidirectional CDR circuit may further include: first circuitry configured to generate the recovered clock signal for use in generating the recovered data signal for output at the first transmit port of the first unidirectional CDR circuit, the recovered data signal being generated from the first received signal at the first receive port of the first unidirectional CDR circuit; second circuitry configured to detect first transitions in the received signal, detect second transitions in the recovered data signal, and generate one or more outputs based on a characteristic of the first transitions of the first received signal and a characteristic of the second transitions of the recovered data signal; third circuitry configured to detect a third transition in the recovered clock signal, detect a fourth transition in the first received signal, and generate one or more outputs that represent a relationship of the third and fourth transition; and fourth circuitry configured to transmit at least one of the one or more outputs of the second circuitry for use in controlling the first circuitry or to transmit one of the one or more outputs of the third circuitry for use in controlling the first circuitry. The circuit may further include: a third I/O port coupled to third transmit circuitry and third receive circuitry. The circuit may also include a fourth I/O port coupled to fourth transmit circuitry and fourth receive circuitry; a second unidirectional CDR circuit includes: a second receive port, a second transmit port. The circuit may also include second multipath circuitry configured to selectively couple the second unidirectional CDR circuit to the third transmit circuitry and the third receive circuitry or the fourth transmit circuitry and the fourth receive circuitry. The circuit may further include: a matrix switch, where the first I/O port is coupled to a first port of the matrix switch and the third I/O port is coupled to a second port of the matrix switch, the matrix switch being controlled by the first multipath circuitry and/or the second multipath circuitry. The matrix switch may further include a third port and a fourth port, and the first multipath circuitry and/or the second multipath circuitry are further configured to selectively couple the first transmit port of the first unidirectional CDR circuit to the third port of the matrix switch or the fourth port of the matrix switch, and to selectively couple the second transmit port of the second unidirectional CDR circuit to the third port of the matrix switch or the fourth port of the matrix switch. The first multipath circuitry may further be configured to selectively couple the first unidirectional CDR circuit to the first transmit circuitry and the first receive circuitry or the second transmit circuitry and the second receive circuitry based on characteristics of one or more signals received from one or more transmitting devices. The second multipath circuitry may further be configured to selectively couple the second unidirectional CDR circuit to the third transmit circuitry and the third receive circuitry or the fourth transmit circuitry and the fourth receive circuitry based on the characteristics of the one or more signals received from the one or more transmitting devices. The first multipath circuitry may be further configured to selectively couple the first unidirectional CDR circuit to the first transmit circuitry and the first receive circuitry or the second transmit circuitry and the second receive circuitry based on characteristics of one or more signals received from one or more transmitting devices. The circuit may further include: a third I/O port coupled to third transmit circuitry and third receive circuitry. The circuit may also include the first multipath circuitry further configured to selectively couple the first unidirectional CDR circuit to the third transmit circuitry and the third receive circuitry. The first multipath circuitry may further be configured to control the coupling of the first transmit port of the first unidirectional CDR to both the input of the first transmit circuitry and the input of the second transmit circuitry. The first multipath circuitry may also include a multiplexer having digital logic gates configured for selective coupling of the first transmit port to the input of the first transmit circuitry or the input of the second transmit circuitry. The first receive circuitry may also include an equalizer. The first multipath circuitry may further be configured to set the first transmit circuitry and/or the first receive circuitry to a low-power state when data is being propagated using the second transmit circuitry and/or the second receive circuitry. Implementations of the described techniques may include hardware, a method or process, or computer software on a computer-accessible medium.

According to a second class of implementations, a half-duplex repeater circuit includes: a first input/output (I/O) port coupled to first transmit circuitry and first receive circuitry. The half-duplex repeater circuit also includes a second I/O port coupled to second transmit circuitry and second receive circuitry. The half-duplex repeater circuit also include a first unidirectional clock and data recovery (CDR) circuit that includes: a first receive port configured to receive a first received signal conforming to a serial data protocol, a first transmit port configured to transmit a recovered data signal generated from the first received signal using a recovered clock signal generated from the first received signal. The half-duplex repeater circuit also includes first multipath circuitry configured to selectively couple the first unidirectional CDR circuit to the first transmit circuitry and the first receive circuitry or the second transmit circuitry and the second receive circuitry. Implementations of the described techniques may include hardware, a method or process, or computer software on a computer-accessible medium.

Implementations within the second class of implementations may include: a third I/O port coupled to third transmit circuitry and third receive circuitry. The circuit may also include the first multipath circuitry further configured to selectively couple the first unidirectional CDR circuit to the third transmit circuitry and the third receive circuitry. The circuit where the first multipath circuitry is further configured to control the coupling of the first transmit port of the first unidirectional CDR to both the input of the first transmit circuitry and the input of the second transmit circuitry. The circuit where the first multipath circuitry includes a multiplexer having digital logic gates configured for selective coupling of the first transmit port to the input of the first transmit circuitry or the input of the second transmit circuitry. The circuit where the first receive circuitry includes an equalizer. The circuit where the first multipath circuitry is further configured to set the first transmit circuitry and/or the first receive circuitry to a low-power state when data is being propagated using the second transmit circuitry and/or the second receive circuitry. Implementations of the described techniques may include hardware, a method or process, or computer software on a computer-accessible medium.

According to a third class of implementations, a circuit includes: first input/output (I/O) port coupled to first transmit circuitry and first receive circuitry. The circuit may also include a second I/O port coupled to second transmit circuitry and second receive circuitry; a first unidirectional circuit includes: a first receive port configured to receive a first received signal conforming to a serial data protocol, a first transmit port configured to transmit a data signal generated from the first received signal. The circuit may also include first multipath circuitry configured to selectively couple the first unidirectional CDR circuit to the first transmit circuitry and the first receive circuitry or the second transmit circuitry and the second receive circuitry. Implementations within the third class of implementations may include: a first unidirectional circuit that may further include: first circuitry configured to generate a recovered clock signal for use in generating the data signal for output at the first transmit port of the first unidirectional circuit, the data signal being generated from the first received signal at the first receive port of the first unidirectional circuit; second circuitry configured to detect first transitions in the received signal, detect second transitions in the recovered data signal, and generate one or more outputs based on a characteristic of the first transitions of the first received signal and a characteristic of the second transitions of the recovered data signal; third circuitry configured to detect a third transition in the recovered clock signal, detect a fourth transition in the first received signal, and generate one or more outputs that represent a relationship of the third and fourth transition; and fourth circuitry configured to transmit at least one of the one or more outputs of the second circuitry for use in controlling the first circuitry or to transmit one of the one or more outputs of the third circuitry for use in controlling the first circuitry. The circuit may further include: a third I/O port coupled to third transmit circuitry and third receive circuitry. The circuit may also include a fourth I/O port coupled to fourth transmit circuitry and fourth receive circuitry; a second unidirectional circuit includes: a second receive port, a second transmit port. The circuit may also include second multipath circuitry configured to selectively couple the second unidirectional CDR circuit to the third transmit circuitry and the third receive circuitry or the fourth transmit circuitry and the fourth receive circuitry. The circuit may also include a matrix switch, where the first I/O port is coupled to a first port of the matrix switch and the third I/O port is coupled to a second port of the matrix switch, the matrix switch being controlled by the first control circuitry and/or the second control circuitry. Implementations of the described techniques may include hardware, a method or process, or computer software on a computer-accessible medium.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. These examples are provided for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure describes multipath clock and data recovery (CDR) circuits and multipath I/O devices for data communications. According to some implementations, a multipath CDR circuit includes one unidirectional CDR circuit (e.g., a single CDR with a feedback loop for extracting a recovered clock signal from a receive signal) with a receive port that can be coupled to different I/O ports, and a transmit port that can be coupled to different I/O ports. The multipath CDR circuit can use a single unidirectional CDR to repeat (e.g., including retime or reclock) a received signal at a particular I/O port at a different I/O port. For example, for a 3-port multipath CDR circuit (e.g., ports I/O1, I/O2, and I/O3), a single unidirectional CDR can provide repeater functionality in each of the multiple paths I/O1→I/O2, I/O1→I/O3, I/O2→I/O1, I/O2→I/O3, I/O3→I/O1, and I/O3→I/O2. The number of different I/O ports in the multipath CDR circuit can be scaled to any number n>1, while still using one unidirectional CDR circuit.

By providing I/O path flexibility while minimizing the power and die area consumed by unidirectional CDR operations, the presently disclosed multipath CDR circuit improves the ability of high-speed serial communication devices to implement different operational modes that fit evolving application needs. As an example, the geometric arrangement of input and output pins for a physical connector can be reconfigured to alleviate orientation constraints when interconnecting dense server deployments in a data center. As another example, for a device with an array of 2-port multipath CDR circuits, the particular number n for downstream channels and m for upstream channels can be adaptively allocated across the total number of channels n+m based on sensed traffic patterns (e.g., upload heavy, download heavy, or balanced traffic). As a further example, for a device with a 5-port multipath CDR circuit (e.g., a hub device with one host port and four slave ports), the signal from the transmit port of the single unidirectional CDR can be broadcast from the host device to, for example, all of the 4 connected slave devices. It should be appreciated that examples presented herein are illustrative and are not intended to limit the range of applications of the disclosed multipath CDR circuits and multipath I/O devices.

In some implementations, each I/O port is coupled to transmit circuitry (e.g., a 3-tap driver) and receive circuitry (e.g., a CTLE followed by a DFE) dedicated to the I/O port. For example, an n-port multipath CDR has one unidirectional CDR and n sets of transmit circuitry and receive circuitry (e.g., n 3-tap drivers, n CTLEs, and n DFEs). The n sets of transmit (receive) circuitry can be multiplexed (demultiplexed) from/to the transmit (receive) port of the one unidirectional CDR using, for example, digital logic gates, passive switches, and/or tri-state components. The multiplexing and demultiplexing circuitry (collectively referred to as "DE/MUX circuitry") can be controlled by a digital state machine embedded with the multipath CDR.

In various implementations, active components in the transmit circuitry and receive circuitry can be powered down by the digital state machine, such as, for example, in coordination with logic controlling the DE/MUX circuitry, thereby saving power.

In certain implementations, the circuits enabled by the present disclosure take advantage of the redundancy in transmit circuitry and receive circuitry to reduce the redundancy in other active components, such as the number of unidirectional CDRs required, while providing the advantages of I/O path flexibility. It should be appreciated that multiple instances of transmit circuitry and receive circuitry, in comparison to circuitry for unidirectional CDR operations, are area efficient, and therefore do not introduce significant increases in die area. Moreover, the instances of transmit circuitry and receive circuitry that aren't needed for a particular configuration can be powered down by, for example, a digital state machine embedded in the multipath CDR, thereby reducing the amount of extra current the redundant circuitry consumes.

It should be appreciated that flexible I/O paths that reduce signal degradation caused by passive components and/or use the same active components to implement upstream paths or downstream paths, including but not limited to unidirectional CDRs, can increase efficiency in terms of power, die area, and/or cost. As one example, being able to configure a single unidirectional CDR for either an upstream path or a downstream path, the number of unidirectional CDRs required can be halved relative to conventional devices. As another example, interfacing two I/O ports to a single unidirectional CDR provides a building block for a multipath I/O device, such as a device having a power and size efficient active matrix switch.

As referred to herein, a port is either a single ended interface or a pair for a differential interface, and an I/O port can either receive a signal or transmit a signal using time multiplexing, in contrast to an output port dedicated for transmitting a signal, or an input port dedicated for receiving a signal.

Figure 1C:
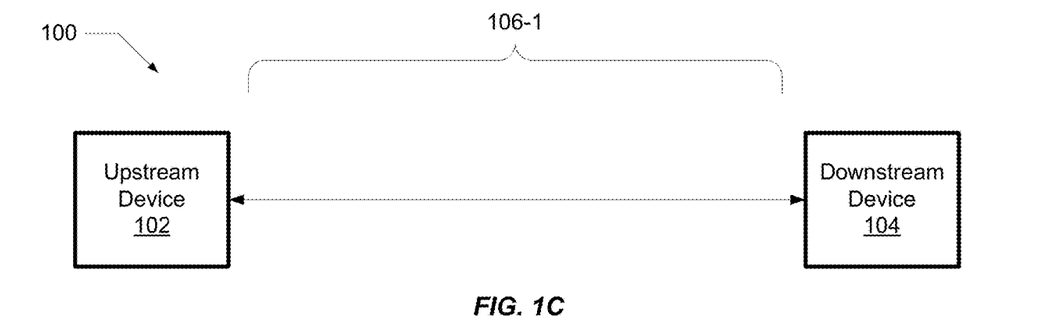
FIGS. 1C-E are simplified block diagrams of serial data transmission systems including implementations of a multipath CDR.

FIG. 1C is a block diagram depicting an example of an implementation of a serial bus communication system 100. Serial bus communication system 100 includes upstream device 102, downstream device 104, and serial bus 106-1. It should be appreciated that serial bus communication system 100 may be a bidirectional communication system, where the upstream device 102 is capable of both transmitting and receiving, and the downstream device 104 is capable of both transmitting and receiving. In bidirectional communication systems, either or both upstream device 102 and downstream device 104 include the multipath clock and data recovery circuit described herein. For example, in bidirectional implementations of serial bus communication system 100 that include full-duplex implementations, two multipath clock and data recovery circuits can be in either the upstream device 102 or downstream device 104, or one multipath clock and data recovery circuit can be in each of the upstream device 102 and downstream device 104. As another example, in bidirectional implementations of serial bus communication system 100 that include half-duplex implementations, one multipath clock and data recovery circuit can be in either the upstream device 102 or downstream device 104.

Figure 1D:
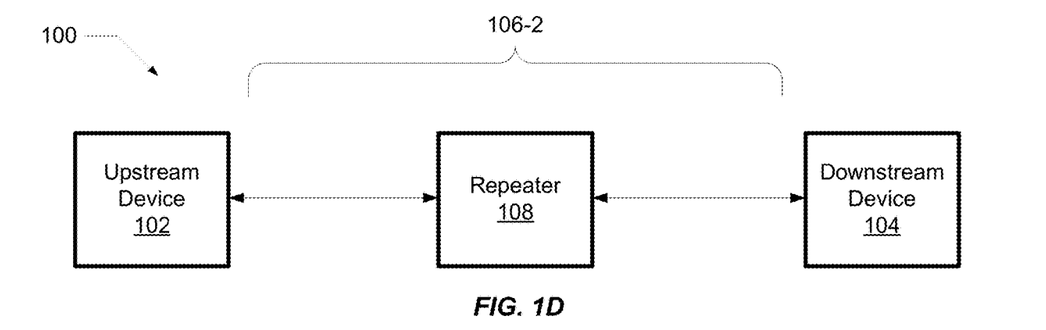

FIG. 1D is a block diagram depicting an example of an implementation in which serial bus 106-2 includes one or more intermediary signal conditioning devices (singly and collectively "repeater 108") coupled in series. It should be appreciated that a single repeater 108 may be used in serial bus 106-2 depending on trace or cable length of the serial bus. For purposes of clarity and not limitation, it shall be assumed that traces are used. Thus, repeater 108 may be used as a serial link driver interface for serial bus 106-2, or multiple repeaters 108 may be used to provide a serial link driver interface for serial bus 106-2. Additionally, it should be appreciated that serial bus 106-2 includes traces formed in a transmission medium such as conductive material or other means for propagating electric signals. It should also be appreciated that for implementations in which multiple repeaters 108 are used, one or more of the repeaters may include one or more of the multipath clock and data recovery circuits as described herein. It should further be appreciated that implementations of serial bus communication system 100 including one or more repeaters may be full-duplex bidirectional or half-duplex bidirectional.

Figure 1E:
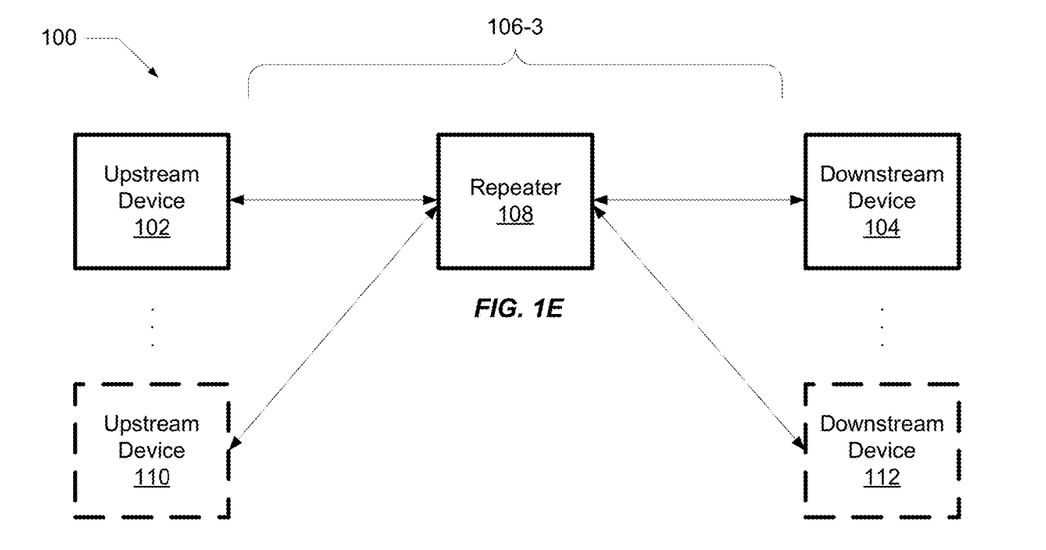

FIG. 1E is a block diagram depicting an example of an implementation including upstream device 102, downstream device 104, and serial bus 106-3. Serial bus 106-3 includes one or more intermediary signal conditioning devices (singly and collectively "repeater 108") with one or more of the multipath clock and data recovery circuits as described herein. Furthermore, there is at least a second upstream device 110 or at least a second downstream device 112. It should be appreciated that the techniques disclosed herein contemplate any permutation in the number n of upstream devices and number m of downstream devices, where n≥1 and m≥1. In a certain class of implementations, the n+m devices may share a single multipath clock and data recovery circuit in a particular intermediary signal conditioning device. For example, for a hub device with one host port and four slave ports, one upstream device and four downstream devices can share a multipath clock and data recovery circuit. In some implementations, the n+m upstream/downstream devices may share one or more multipath clock and data recovery circuits included in one or more intermediary signal conditioning devices constituting repeater 108. As an example, for a hub device with an array of p>1 multipath clock and data recovery circuits, each multipath clock and data recovery can be adaptively allocated across the n+m upstream/downstream devices based, for example, on sensed traffic patterns (e.g., upload bandwidth, download bandwidth).

In relation to FIGS. 1C-E, upstream device 102 and/or repeater 108 may be implemented in a larger device or system such as any in a variety of integrated circuits or devices including, but not limited to, input/output ("I/O") hubs, root complexes, servers, and laptop docking stations, among others. Furthermore, it should be appreciated that downstream device 104 may be embedded in a larger device or system such as any in a variety of peripheral devices including, but not limited to, hard disk drives, graphics cards, and daughter cards, among others. It should be appreciated that reference to upstream device and downstream device throughout this disclosure are for example purposes and not limiting, and the examples of upstream device and downstream device can correspond to terminal communication devices for serial standards that do not utilize a host-slave or hierarchical topology.

Communication via serial bus 106-1, 106-2, and/or 106-3 may use a differential or single-ended signaling protocol. For example, upstream device 102 may include a differential output driver (not shown) for providing a differential signal. Downstream device 104 may include a differential input driver (not shown). Repeater 108, when present, processes an output transmission from upstream device 102 to provide such processed output transmission to another repeater or directly to downstream device 104. Downstream device 104 may include a differential input driver (not shown). There are many known differential digital signaling protocols that may be used with serial bus communication system 100 such as, for example, Current Mode Logic ("CML"), differential Stub-Series Terminated Logic ("SSTL"), differential High-Speed Transceiver Logic ("HSTL"), Low-Voltage Differential Signaling ("LVDS"), differential Low-Voltage Positive Emitter Coupled Logic ("LVPECL"), and Reduced Swing Differential Signaling ("RSDS") among other differential digital signaling protocols. Additionally, implementations are contemplated that use single-ended serial interface protocols such as, for example, Low Voltage Transistor-Transistor Logic ("LVTTL") such as used for PCI, and Low Voltage Complementary Metal Oxide Semiconductor ("LVCMOS"), among other single-ended serial interface protocols. Conventionally PCI uses an LVTTL input buffer and a push-pull output buffer.

Figure 2:
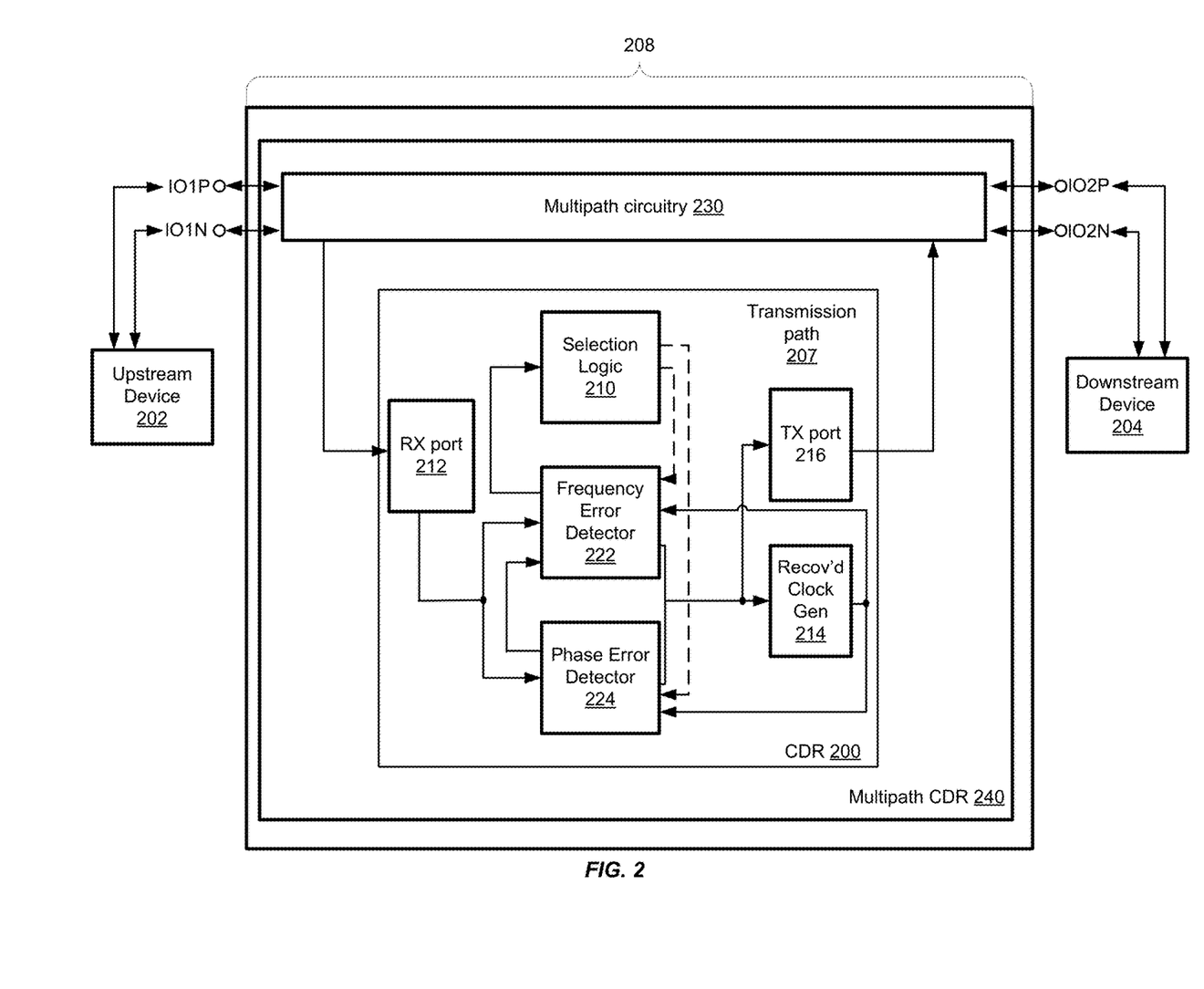
FIG. 2 is a simplified block diagram of a specific implementation of a multipath CDR.

FIG. 2 is a simplified block diagram of an implementation including a repeater 208 having a unidirectional CDR 200 that operates to align the clock/data strobe with incoming data to achieve a low bit error rate. Unidirectional CDR 200 includes receive port 212 for receiving from signal conditioning circuitry (not shown) in multipath circuitry 230 a signal corresponding to a differential signal received on IO1P and IO1N, or a single ended signal, output by the upstream device 202.

The connections between blocks within repeater 208 are depicted with single lines for clarity, but it will be understood that they may represent single-ended or differential signals depending on the implementation. It should further be noted that the serial data may use non-return to zero (NRZ) or return to zero (RZ) signaling.

It should be appreciated that FIG. 2 depicts clock and data recovery circuitry 200 as being in an intermediary signal conditioning device, such as in repeater 208 positioned between upstream device 202 and downstream device 204. However, it should be noted that clock and data recovery circuitry 200 as described herein can be included in the receiver circuitry of downstream device 204, or the receiver circuitry for upstream device 202.

Unidirectional CDR 200 further includes frequency error detector 222 and phase error detector 224, each configured to receive the incoming signal from receive port 212. Frequency error detector 222 and phase error detector 224 are also each configured to provide outputs to recovered clock generation circuitry 214 for use in generation of a recovered clock signal. Unidirectional CDR 200 also includes selection logic 210 for controlling whether the outputs of the frequency error detector 222 or the phase error detector 224 are to be provided to recovered clock generation circuitry 214. Frequency error detector 222 and/or the phase error detector 224 are also each configured to provide outputs to transmit port 216 for transmitting a signal to a destination, such as downstream device 204, through signal conditioning circuitry (not shown) in multipath circuitry 230 over differential traces IO2P and IO2N.

Certain implementations of unidirectional CDR 200 include a reference-based clock and data recovery circuit that includes a frequency-locked loop (FLL) corresponding to frequency error detector 222 and a phase-locked loop (PLL) corresponding to phase error detector 224. A reference clock generated by a crystal oscillator is used in the FLL to drive a VCO frequency in the recovered clock generation circuitry 214 towards the incoming data rate. After frequency acquisition, the PLL achieves phase lock and the VCO clock is aligned with the incoming data. Two separate loop filters, one for the PLL (or a delay locked loop (DLL)) and one for the FLL, independently set the loop dynamics of the PLL and FLL, respectively. In some implementations, selection logic 210 controls which loop filter is applied to the main CDR loop.

It should be appreciated that the techniques disclosed herein are not limited to reference-based CDRs. In some implementations, a referenceless CDR design can be used, thereby eliminating the need for an additional clock source, such as a crystal oscillator.

It should be noted that unidirectional CDR 200, because of active elements such as the PLL, FLL, and/or DLL, is a unidirectional active component. Therefore, FIG. 2 shows a unidirectional transmission path 207 through unidirectional CDR 200. In the absence of multipath circuitry 230, it will be understood by a person having ordinary skill in the art that circuitry substantially identical to unidirectional CDR 200 may be dedicated to transmitting serial data from downstream device 204 for receiving at upstream device 202, and repeater 208 may include additional circuitry substantially identical to unidirectional CDR 200 dedicated to receiving serial data from downstream device 204 to transmit to upstream device 202.

In FIG. 2, the combination of multipath circuitry 230 and unidirectional CDR 200 enables unidirectional CDR 200 to be used to implement the upstream channel or the downstream channel between upstream device 202 and downstream device 204. As referred to herein, the use of unidirectional CDR 200 to implement the upstream channel or the downstream channel refers to using the same unidirectional CDR circuitry (e.g., frequency error detector 222, phase error detector 224, selection logic 210, and recovered clock generation circuitry 214) to implement either the upstream channel or the downstream channel. This is to be distinguished from bidirectional data transmission enabled by a grouping of CDR related circuitry that includes, for example, two or more frequency error detectors, each one dedicated to either the upstream channel or the downstream channel. For instance, commercially available devices with circuitry referred to as a bidirectional CDR includes two sets of frequency error detectors, phase error detectors, selection logic, and recovered clock generation circuitry, one set dedicated to the upstream channel, and one set dedicated to the downstream channel, and would not be considered to use the same unidirectional CDR circuitry to implement either an upstream channel or a downstream channel as enabled by the present disclosure.

It should be appreciated that the combination of multipath circuitry 230 and unidirectional CDR 200 enables unidirectional CDR 200 to be used in different I/O paths. While unidirectional CDR 200 can be used to implement an upstream channel or a downstream channel, it should further be appreciated that unidirectional CDR 200 remains a unidirectional active component (in contrast to a bidirectional passive component), even when combined with multipath circuitry 230 as illustrated in FIG. 2.

For clarity purposes, the combination of unidirectional CDR 200 and multipath circuitry 230 is referred to as a "multipath CDR," as illustrated by multipath CDR 240. For the purposes of the present disclosure, the multipath characteristic is not limited to the characteristic of supporting bidirectional (e.g., transmit and receive) traffic. For example, a 2-port multipath CDR, as illustrated in FIG. 2 by multipath CDR 240, has a first I/O port (IO1P and IO1N) and second I/O port (IO2P and IO2N), with each I/O port being bidirectional. The 2-port multipath CDR is multipath in terms of having two I/O ports and being able to direct bidirectional (i.e., transmit or receive) traffic to/from either of the two I/O ports to the other. Similarly, a 3-port multipath CDR is also multipath in terms of having three I/O ports and being able to direct transmit and receive traffic to/from any of the three I/O ports to any other of the I/O ports. Moreover, a multipath CDR can also perform multicast and/or broadcast capabilities in addition to handling bidirectional traffic at a particular I/O port. For example, for a 3-port multipath CDR, data received on one of the three I/O ports may be broadcast by transmitting on both of the other two I/O ports.

Therefore, the multipath circuitry 230 disclosed herein improves I/O path flexibility in its flexible use of unidirectional active components, such as unidirectional CDR 200.

In certain implementations, one or more unidirectional active components other than or in addition to a unidirectional CDR can be combined with multipath circuitry 230. For example, a low noise amplifier, a power amplifier, a digital filter, and so forth can be combined with multipath circuitry 230 to provide multipath functionality for a unidirectional active component. As another example, a redriver without a unidirectional CDR that can be used to equalize the upstream channel signal and retransmit the signal to the downstream channel can be combined with multipath circuitry 230.

Figure 3:
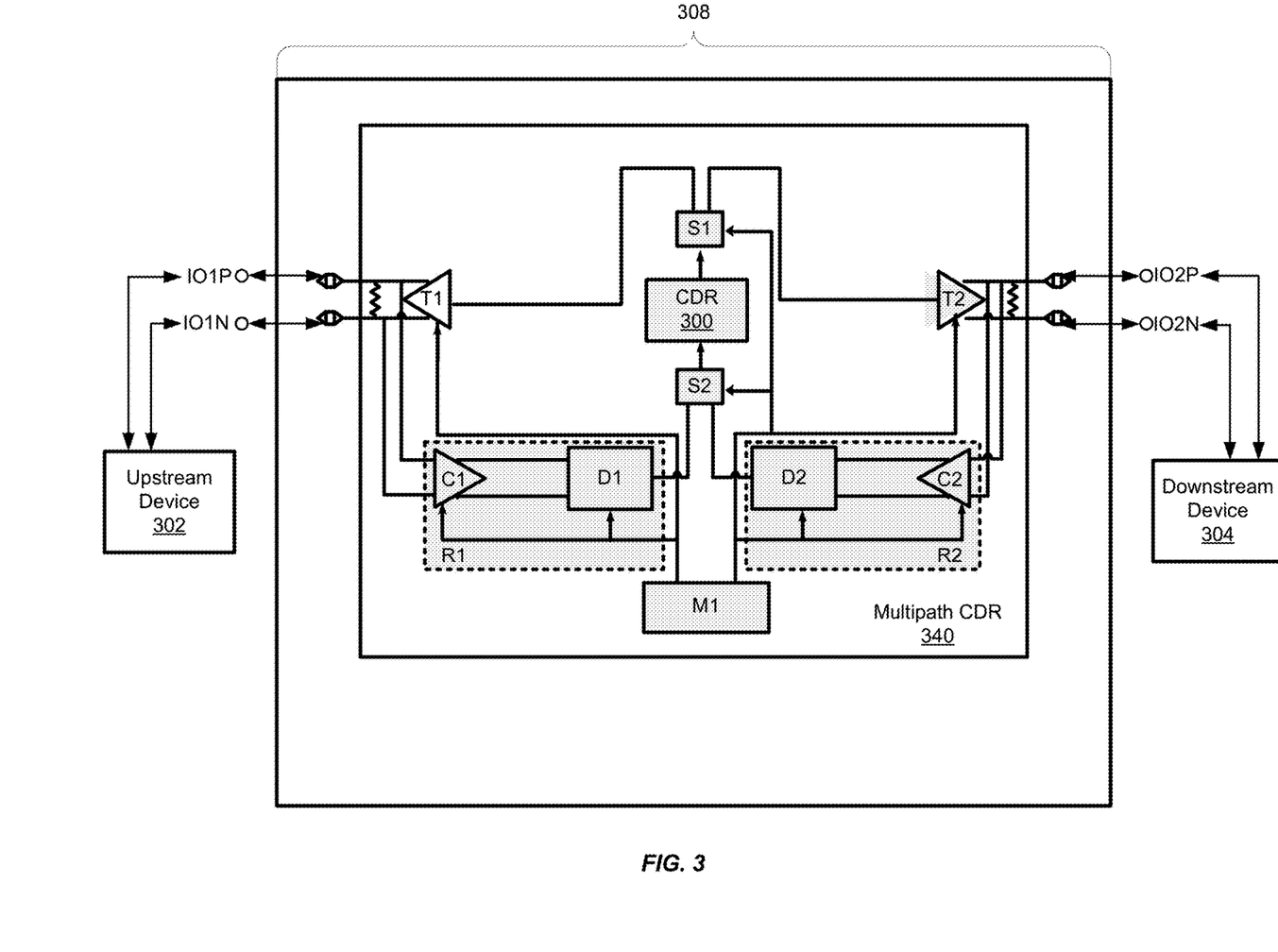
FIG. 3 is a simplified block diagram of another specific implementation of a multipath CDR.

FIG. 3 is an example implementation of a multipath CDR circuit 340 in a repeater 308 coupled to an upstream device 302 and a downstream device 304. It should be appreciated that reference to upstream device and downstream device throughout this disclosure are for example purposes and not limiting, and the multipath CDR circuit 340 can be coupled to terminal communication devices for serial standards that do not utilize a host-slave or hierarchical topology. It should further be appreciated that reference to a repeater is for example purposes, and multipath CDR circuit 340 can be included in other devices, such as a hub, serial communication protocol converter (e.g., USB to FireWire), or an adapter between different physical channels (e.g., electrical to optical), and so forth.

Multipath CDR circuit 340 includes circuitry for extracting timing information and data from a serial data stream, such as a unidirectional CDR 300. For clarity purposes, the implementation details of unidirectional CDR circuitry included in unidirectional CDR 300, discussed elsewhere in this disclosure, are not repeated.

Unidirectional CDR 300 includes a receive port that is coupled to a signal selection interface S2, and a transmit port coupled to a signal selection interface S1. S2 provides a circuit for selecting whether an input provided to a first I/O port IO1 (illustrated by differential interface IO1P and IO1N) or an input provided to a second I/O port IO2 (illustrated by differential interface IO2P and IO2N) is coupled to the receive port of unidirectional CDR 300. It should be appreciated that there may be additional I/O ports (not shown in FIG. 3). S1 provides a circuit for selecting whether the output of the transmit port of unidirectional CDR 300 is transmitted over the first I/O port (IO1P and IO1N), the second I/O port (IO2P and IO2N), or both I/O ports (e.g., for a broadcast or multicast operation).

In certain implementations, S1 and S2 are implemented using passive components, such as bidirectional switches. In some implementations, S1 and S2 are implemented using active components such as, for example, logic gates (e.g., NAND, NOR, etc.), tri-state components, decoder circuitry, multiplexer circuitry, or any combination thereof. It should be appreciated that S1 and S2 can be implemented with combinations of passive and active components, and/or combinations of analog and digital components.

S1 and S2 are controlled by control logic M1. In some implementations, control logic M1 is a microprocessor, programmable logic device, or any of a variety of other digital state machines. Control logic M1 can be embedded within or external to multipath CDR circuit 340, or embedded within or external to repeater 308. Portions of control logic M1 may be distributed within multipath CDR circuit 340, repeater 308, upstream device 302, or downstream device 304. Control logic M1 communicates with S1 and S2 using any of a variety of interfaces, such as, for example, the Inter-Integrated Circuit (I²C) or System Management Bus (SMBus or SMB) data bus standards. It should be appreciated that control logic M1 can perform functions other than controlling the signal selection operations of S1 and S2, such as, for example, powering up or down S1, S2, or other components in multipath CDR circuit 340 (e.g., transmit or receive front-ends, components within unidirectional CDR 300, etc.).

First I/O port IO1 (IO1P and IO1N) is coupled to the output of transmit circuitry T1 and the input of receive circuitry R1, such as, for example, through a resistive (e.g., 100 ohm) network as illustrated in FIG. 3. Similarly, second I/O port IO2 (IO2P and IO2N) is coupled to the output of transmit circuitry T2 and the input of receive circuitry R2.

T1 and T2 include driver circuitry for generating a signal matched to the characteristics of a subsequent circuit stage, such as a USB 3.0 cable, a PCB trace, an optical fiber, copper wire, Ethernet cable, and so forth. In some implementations, T1 and T2 include substantially identical circuitry and are each implemented as 3-Tap driver circuits. The reference to a 3-Tap driver circuitry is for example purposes, and is not intended to limit the types of circuitry that can be included in transmit circuitry T1 and T2, such as, for example, other types of power amplification, pre-emphasis, or feed forward equalization (FFE) circuitry, etc.

Receive circuitry R1 and R2 may include equalization circuitry to compensate for losses and distortions in the received signal path, such as but not limited to frequency distortion caused by transmission line effects, and/or insertion losses due to impedance mismatches. In some implementations, R1 includes a Continuous Time Linear Equalizer (CTLE) C1 to correct for losses and distortions caused by high frequency transmission lines, followed by a decision feedback equalizer (DFE) D1 that uses feedback of detected symbols to produce an estimate of the channel output, as depicted in the dashed box labeled R1 in FIG. 3. The reference to CTLE and DFE are for example purposes, and are not intended to limit the types of circuitry that can be included in receiver circuitry R1 and R2, such as, for example, other types of linear or nonlinear receive equalization or error correction circuitry, etc.

It should be appreciated that R2 can contain substantially identical circuitry as R1 such as, for example, CTLE C2 and DFE D2. It should further be appreciated that R1, R2 and T1, T2 may contain circuitry that is not substantially identical such as, for example, when IO1 is an I/O port for interfacing to a copper physical medium, and IO2 is an I/O port for interfacing to an optical fiber physical channel. As another example, IO1 is an I/O port for interfacing to a USB bus, and IO2 is an I/O port for interfacing to an IEEE 1394 FireWire bus.

In various implementations, components in the transmit circuitry T1 or T2 and/or receive circuitry R1 or R2 may be selectively powered down by the control logic M1. For example, when multipath CDR circuit 340 is receiving a signal at IO1 for transmission over IO2, transmit circuitry T1 and receive circuitry R2 can be in a low-power state. In some implementations, control logic M1 performs power saving in coordination with logic controlling the signal selection circuitry S1 and S2. For instance, control logic M1 powers down T1 and R2, or T2 and R1, based on the state of S2 and S1. As another example, the state of S1 and S2 are used by multipath CDR circuit 340 in determining which transmit and receive circuitry to power down. In various implementations, the logic for powering down transmit and receive circuitry is independent from the logic for controlling S2 and S1. It should be appreciated that the control logic M1 for conserving power in transmit circuitry T1 or T2 and/or receive circuitry R1 or R2 may be in coordination with logic controlling power savings for components within unidirectional CDR 300.

In certain implementations, control logic M1 senses the presence of a received signal at either IO1 or IO2 to determine which active components to power down. It should be appreciated that the transmit or receive circuitry or different subsets of the transmit or receive circuitry (e.g., power down CTLE C2, but not DFE D2) being powered down can be configured to different power saving states. For example, control logic M1 can select between an active state, a standby state with moderate power savings and fast start up time, and an ultralow power state with higher power savings but slower startup time, for the different components within the transmit or receive circuitry.

In certain implementations, multipath CDR circuit 340 reduces signal degradation caused by passive components and/or uses the same unidirectional CDR 300 to implement either the upstream path or the downstream path, thereby increasing efficiency in terms of power, die area, or cost. It should be appreciated that the single unidirectional CDR circuit in the multipath CDR circuit is not bidirectional. However, the configuration of the multipath CDR circuit allows flexibility in the choice of the I/O path for which the single unidirectional CDR circuit can be used. Multipath CDR circuit 340 can be used to implement a multipath I/O device, such as a device having a power and size efficient active matrix switch.

Figure 4:
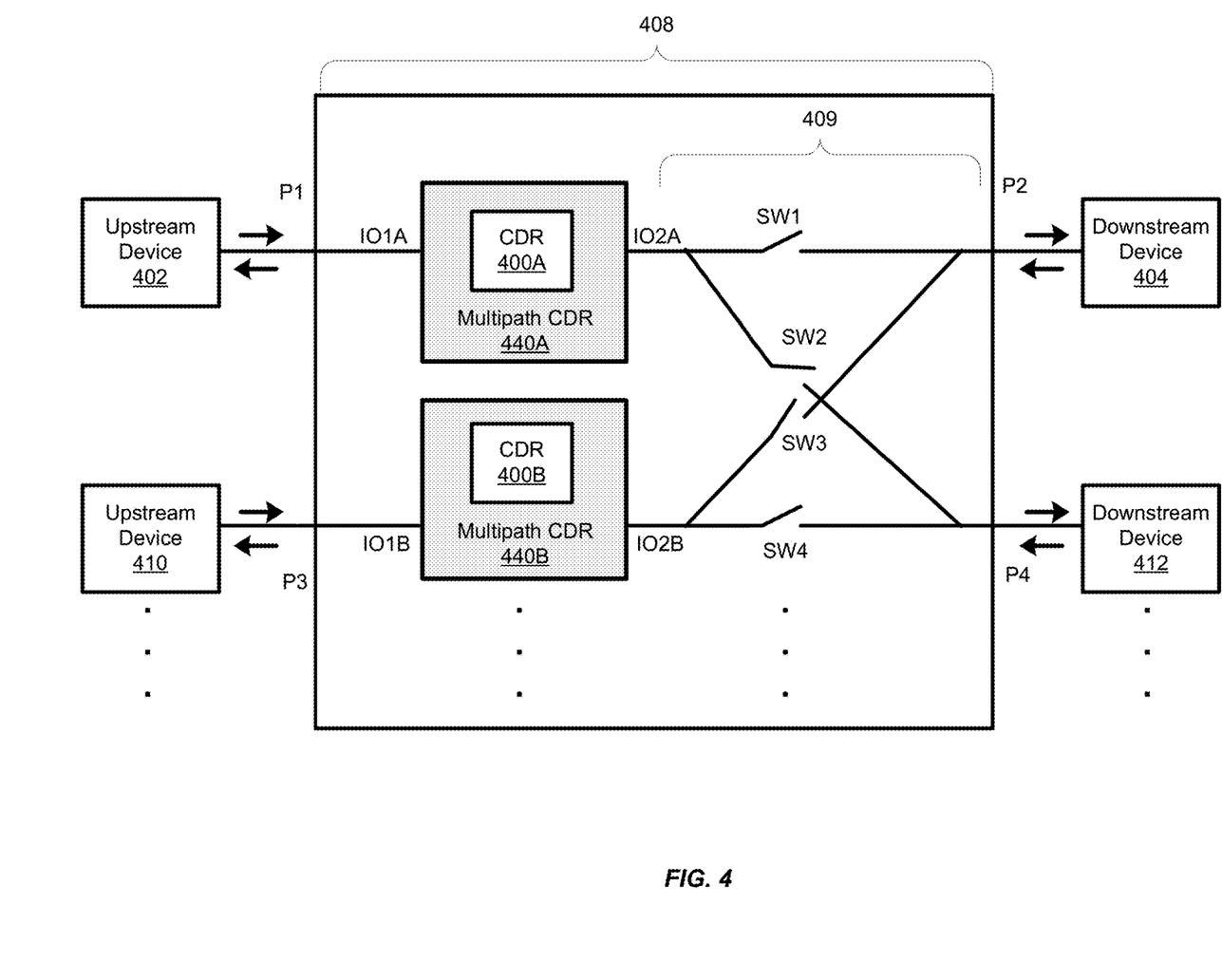
FIG. 4 is a simplified block diagram of a specific implementation of an array of multipath CDRs.

FIG. 4 is an example implementation of a multipath I/O device 408 that interconnects upstream device 402, upstream device 410, downstream device 404, and downstream device 412. Multipath I/O device 408 as illustrated includes a 2×1 array of 2-port multipath CDR circuits coupled to a four-port passive matrix switch 409.

The passive matrix switch 409 includes four passive switch components, SW1-SW4. Each of these passive switches allows signals to propagate in either direction, thereby providing a high flexibility switching fabric. It should be appreciated that passive matrix switch 409 can be extended with additional switch components to provide an n-port passive matrix switch, where n can be any integer number greater than two. In certain implementations, the components in passive matrix switch 409 can vary based on the characteristics of the devices being interconnected to multipath I/O device 408, such as downstream device 404 and downstream device 412 having different transmission line and/or impedance characteristics. As referred to herein, a matrix switch refers to a network of multiple switching components. In various implementations, passive matrix switch 409 can be replaced or augmented with a matrix switch having active components (e.g., tri-state buffers, digital logic gates, CMOS transistors etc.).

The 2×1 array of 2-port multipath CDR circuits includes multipath CDR 440A and multipath CDR 440B. As depicted in FIG. 4, multipath CDR 440A and multipath CDR 440B each include unidirectional CDR 400A and unidirectional CDR 400B, respectively. Multipath CDR 440A and multipath CDR 440B each have two bidirectional I/O ports, as illustrated by the two I/O ports IO1A and IO2A for multipath CDR 440A, and the two I/O ports IO1B and IO2B for multipath CDR 440B. In various implementations, the 2×1 array of 2-port multipath CDR circuits can be extended with additional 2-port multipath CDR circuits to provide a n×1 array, where n can be any positive integer number. In some implementations, multipath CDR 440A (and/or unidirectional CDR 400A) and multipath CDR 440B (and/or unidirectional CDR 400B) may include circuitry that is not substantially identical, as would be the case, for example, when upstream device 402 is an optical communication device, and upstream device 410 is a USB communication device.

It should be appreciated that while FIG. 4 depicts multipath CDR circuitry 440A-B coupled to one end of passive switch components SW1-SW4, in a class of implementations, circuitry in multipath CDR circuitry 440A-B can be distributed across both ends of passive switch components SW1-SW4, such that equalization provided by receive circuitry (e.g., R1-R4 in FIG. 3) precedes any passive switch components when receiving through any I/O path. It should further be appreciated that the scaling of the passive matrix switch and the size of the array of the multipath CDR circuits allows multipath I/O device 408 to interconnect n devices, where n can be any integer number greater than 1.

In various implementations, multipath I/O device 408 provides I/O flexibility. For example, multipath I/O device 408 can transmit or receive over any of the multiple communication paths (e.g., P1↔P2, P1↔P3, P1↔P4, P2↔P4, P3↔P2, and P3↔P4). As another example, the passive matrix switch 409 and multipath CDRs 440A-B are bidirectional, therefore multipath I/O device 408 is agnostic to whether each of the devices 402, 404, 410, and 412 are bidirectional transceivers, unidirectional transmitters, or unidirectional receivers. As a further example, multipath CDR 440A (and/or 440B) and passive matrix switch 409 can be configured such that data is simultaneously transmitted over the I/O paths P1→P2, P1→P3, and P1→P4 (and/or P3→P1, P3→P2 and P3→P4), thereby enabling broadcast functionality. Similarly, multipath CDR 440A and passive matrix switch 409 can be configured such that data is simultaneously transmitted over, for instance, P1→P2 and P1→P4 (or P1→P3 and P1→P4), thereby enabling multicast functionality to a selectable subset of interconnected devices. As yet another example, each of multipath CDR 440A-B can be configured for particular data traffic patterns. For example, multipath CDR 440A-B can be manually configured for the anticipated traffic patterns generated by devices 402, 404, 410, and 412, such as, for example, during the setup of a data center. As another example, multipath CDR 440A-B can be dynamically configured, in real-time or intermittently, such as, for example, by sensing the data traffic patterns generated by devices 402, 404, 410, and 412. The following examples will be instructive.

In certain implementations, upstream device 402 and upstream device 410 correspond to different physical channels for the same physical device. For example, upstream device 402 and upstream device 410 as depicted in FIG. 4 can correspond to the same hard disk drive (HDD) in a data center server, with upstream device 402 representing a first set of one or more transmit/receive pins (referred to in this example as channel 1) and upstream device 410 representing a second set of one or more transmit/receive pins (referred to in this example as channel 2).

Depending on the particular application scenario, whether channel 1 and/or channel 2 are transmitting data from the server or receiving data for the server may vary. For example, if the server is performing a task such as providing fragments for a streaming video service, both channel 1 and channel 2 are configured as transmit interfaces (i.e., multipath I/O device 408 configures multipath CDR 440A to transmit data from P1→P2, and multipath CDR 440B to transmit data from P3→P4). As another example, if the server is storing live video that is being encoded in real-time, both channels are configured as receive interfaces (i.e., multipath I/O device 408 configures multipath CDR 440A to transmit data from P2→P1, and multipath CDR 440B to transmit data from P4→P3). As a further example, if the server is simultaneously storing real-time encoded video data and providing streaming video services, one channel is configured as a transmit interface and the other channel as a receive interface (i.e., multipath I/O device 408 configures multipath CDR 440A to transmit data from P1→P2, and multipath CDR 440B to transmit data from P4→P3). In various implementations, throughput adaptation is controlled by control logic M1 of FIG. 3, such as by controlling signal selection circuitry S1 and S2.

It should be appreciated that the ability to configure the directionality of paths in the multi-path I/O device, dynamically in certain implementations, can allow the overall data payload to be increased by virtue of increasing the data rate for a particular direction of traffic (e.g., increasing the downstream traffic data rate in response to detecting or predicting that downstream traffic is or will be greater than upstream traffic).

Continuing the above example, in some implementations, downstream device 404 represents a set of one or more transmit/receive pins (referred to in this example as channel 3) and downstream device 412 represents another set of one or more transmit/receive pins (referred to in this example as channel 4) in a server in a data center providing cloud-based streaming video services.

The physical interface for connecting to channels 1 and 2 in one device and channels 3 and 4 in another device may be specified by, for example, form factor specifications that specify geometry, orientation, size, etc., for a particular data communication protocol (e.g., form factors for a PCI-E planar printed circuit board for insertion into a motherboard slot, or for cables and/or connectors for USB 3.0, DisplayPort, SATA, IEEE 1394, HDMI, hybrid connectors such as Type C USB/DisplayPort, etc.). The configuration of servers in a data center can result in the physical interfaces for channels 1 and 2 not being aligned with channels 3 and 4 (e.g., requires a cable to be twisted 180°). Multipath I/O device 408 can configure signal selection circuitry within multipath CDR 440A-B and/or passive matrix switch 409 to change the I/O path P1↔P2 to P1↔P4, and P3↔P4 to P3↔P2, such that the orientation of the cable does not need to be adjusted to align the physical interfaces for channels 1 and 2 with channels 3 and 4.

It should be appreciated that device 402, device 410, device 404, and device 412 in FIG. 4 can be distributed across one or more devices (e.g., they can be in the same server, or can each correspond to different servers, or some combination thereof, etc.). For example, device 402 can be in a server providing streaming video services, and device 404, 410, 412 can each be in separate content delivery network (CDN) edge servers. In certain implementations, multipath I/O device 408 can be a network device that allows an output of device 402 in a video server to be broadcast for caching at multiple CDN edge servers, such as device 404, 410, 412 (or multicast to a particular subset), in a single transaction rather than through multiple transactions.

It should further be appreciated that the above example scenarios of streaming video/encoding video or a data center is for example purposes and is not intended to be limiting. The disclosed multipath I/O device 408 can be deployed to provide high flexibility in a wide variety of applications, including but not limited to a multi-display graphics systems (e.g., DisplayPort and reverse DisplayPort, etc.), network communication devices, computing peripheral interconnects, automotive/avionic data buses, load-balancing and/or fault tolerance systems, Redundant Array of Independent Disks (RAID) deployments, repeaters, multiplexing/demultiplexing interfaces, etc., and combinations thereof (e.g., Type C USB with DisplayPort).

Figure 5:
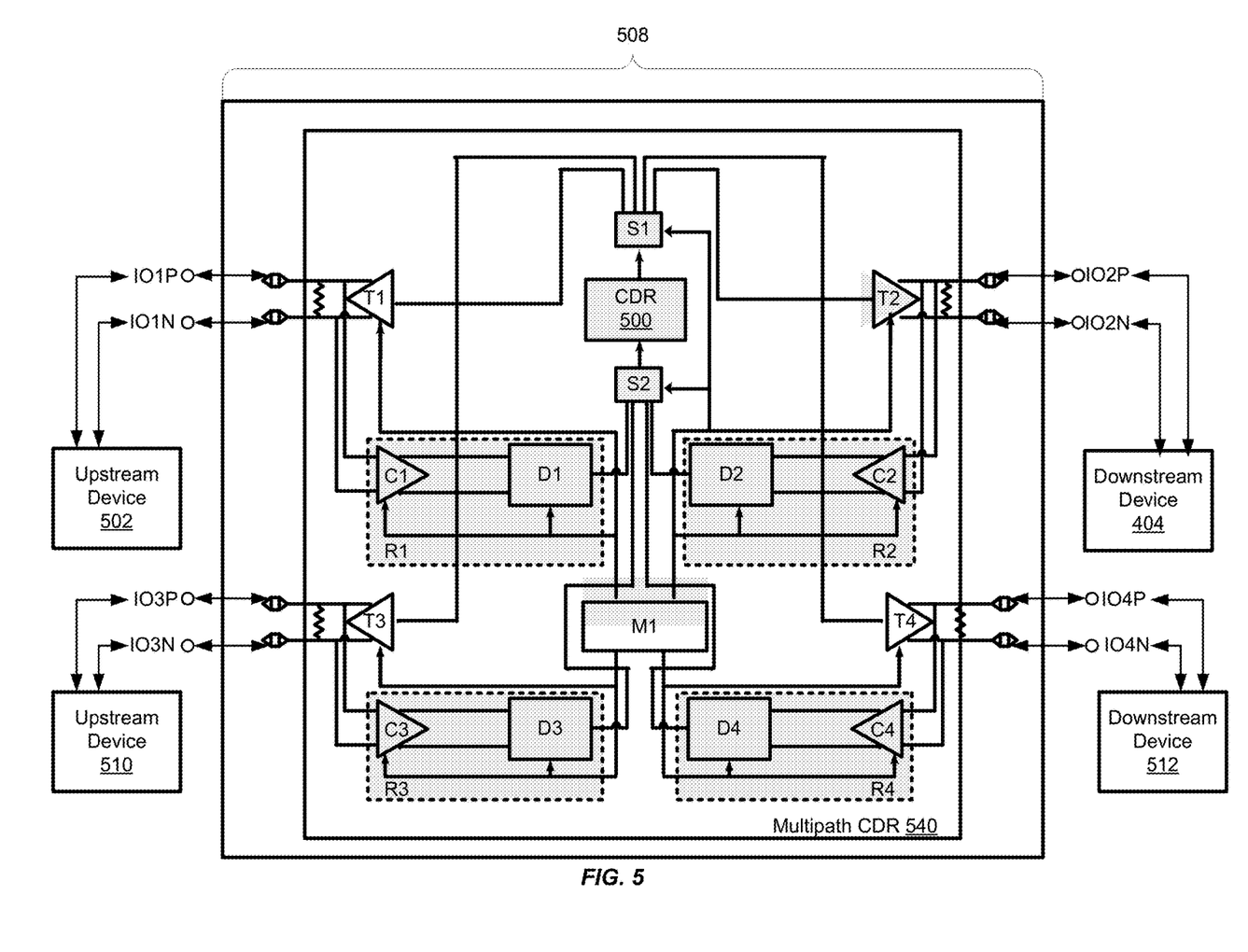
FIG. 5 is a simplified block diagram of a further specific implementation of a multipath CDR.

FIG. 5 is an example implementation of a multipath I/O device 508 that interconnects upstream device 502, upstream device 510, downstream device 504, and downstream device 512. Multipath I/O device 508 includes a 4-port multipath CDR circuit 540. It should be appreciated that additional I/O ports can be provided, such as by increasing the number of outputs for signal selection interface S1 and inputs for signal selection interface S2 to provide a n-port multipath I/O device, where n can be any integer number greater than two.

In FIG. 5, multipath CDR circuit 540 includes unidirectional CDR 500. Unidirectional CDR 500 can be selectively coupled to four bidirectional ports, as illustrated by the IO1P and IO1N differential ports for receive circuitry R1 and transmit circuitry T1, the IO2P and IO2N differential ports for receive circuitry R2 and transmit circuitry T2, the IO3P and IO3N differential ports for receive circuitry R3 and transmit circuitry T3, and the IO4P and IO4N differential ports for receive circuitry R4 and transmit circuitry T4.

Multipath I/O device 508 provides I/O flexibility. For example, control logic M1 can configure signal selection interface S2 to couple any of the four receive circuitry R1-4 to the input port of unidirectional CDR 500. Control logic M1 can also configure signal selection interface S1 to couple any one or more of the four transmit circuitry T1-4 to the output port of unidirectional CDR 500. Therefore, multipath I/O device 508 can transmit or receive over any of the multiple communication paths formed between the I/O ports IO1-4. Multipath CDR 540 supports bidirectional communication, and is therefore agnostic to the direction of data transfer for devices 502, 504, 510, and 512.

It should be appreciated that the multipath I/O devices presently disclosed can include signal selection circuitry that uses passive components (e.g., passive matrix switch 409 in FIG. 4), active components (e.g., signal selection interface S1 and S2 in FIG. 5), or a combination of passive and active components.

It should further be appreciated that the output of signal selection interface S2 can be configured to select between the inputs of multiple unidirectional CDRs, such as, for example, for broadcast or fault tolerance purposes. Similarly, the input of signal selection interface S1 can also be configured to select between the outputs of multiple unidirectional CDRs.

In some implementations, the n-port multipath CDR circuit 540 of FIG. 5 can be included in an m×1 array (not depicted) of n-port multipath CDR circuits. For example, IO1 of a first n-port multipath CDR circuit and IO1 of a second n-port multipath CDR circuit in the array can both be coupled to the same upstream device 502. Control logic M1, upon detecting that a unidirectional CDR in the first n-port multipath CDR circuit has failed, can re-route the I/O path to use a unidirectional CDR in the second n-port multipath CDR circuit in the array.

In FIG. 5, the depicted I/O ports IO1-4 for multipath CDR circuit 540 include one unidirectional CDR (unidirectional CDR 500), four sets of transmit circuitry (T1-4), and four sets of receive circuitry (R1-4).

The 4-port multipath CDR has additional transmit circuitry and receive circuitry relative to the four ports for an array of 2 unidirectional CDRs (which corresponds to two input ports, and two output ports), such as a circuit with one unidirectional CDR dedicated to the upstream channel and a separate unidirectional CDR dedicated to the downstream channel, each unidirectional CDR having its own transmit circuitry and receive circuitry.

It is normally undesirable due to power consumption and die area efficiency concerns to increase the redundancy in transmit circuitry or receive circuitry. However, in certain implementations, the multipath CDR circuit enabled by the present disclosure takes advantage of the redundancy in transmit circuitry and receive circuitry to reduce the redundancy in other active components, such as the number of unidirectional CDRs required, while providing the advantages of I/O path flexibility previously discussed.

For example, a 4-port multipath CDR circuit has 1 unidirectional CDR, thereby offering a reduction in the power consumption and die area consumed by unidirectional CDR operations relative to a corresponding array of 2 unidirectional CDRs with the same number of ports. It should further be appreciated that transmit circuitry and receive circuitry, such as the CTLE, DFE, and 3-tap drivers, and the DE/MUX circuitry, in comparison to circuitry for unidirectional CDR operations, are area efficient, and therefore do not introduce significant increases in die area. Moreover, these circuits (e.g., CTLE, DFE, and 3-tap drivers) can be powered down by the digital state machine embedded in the multipath CDR, reducing the amount of extra current they consume.

Various implementations described herein may be implemented using any in a variety of standard or proprietary CMOS processes. In addition, it should be noted that implementations are contemplated that may employ a much wider range of semiconductor materials and manufacturing processes including, for example, GaAs, SiGe, etc. Multipath CDRs and/or multipath I/O devices as described herein may be represented (without limitation) in software (object code or machine code in non-transitory computer-readable media), in varying stages of compilation, as one or more netlists (e.g., a SPICE netlist), in a simulation language, in a hardware description language (e.g., Verilog, VHDL), by a set of semiconductor processing masks, and as partially or completely realized semiconductor devices (e.g., an ASIC). Some implementations may be a standalone integrated circuit, while others may be embedded as part of larger system on a chip.

It will be understood by those skilled in the art that changes in the form and details of the implementations described above may be made without departing from the scope of this disclosure. In addition, although various advantages have been described with reference to some implementations, the scope of this disclosure should not be limited by reference to such advantages. Rather, the scope of this disclosure should be determined with reference to the appended claims.

What is claimed is:

1. A circuit, comprising:
   a first input/output (I/O) port coupled to first transmit circuitry and first receive circuitry;
   a second I/O port coupled to second transmit circuitry and second receive circuitry;
   a first unidirectional clock and data recovery (CDR) circuit comprising:
      a first receive port configured to receive a first received signal conforming to a serial data protocol;
      a first transmit port configured to transmit a recovered data signal generated from the first received signal using a recovered clock signal generated from the first received signal; and
   first multipath circuitry configured to selectively couple the first unidirectional CDR circuit to the first transmit circuitry and the first receive circuitry or the second transmit circuitry and the second receive circuitry.

2. The circuit of claim 1, the first multipath circuitry further comprising:
   first signal selection circuitry configured to selectively couple the first transmit port to an input of the first transmit circuitry or an input of the second transmit circuitry;
   second signal selection circuitry configured to selectively couple the first receive port to an output of the first receive circuitry or an output of the second receive circuitry; and
   first control circuitry configured to control the first signal selection circuitry for selective coupling of the first transmit port to the input of the first transmit circuitry or the input of the second transmit circuitry, or to control the second signal selection circuitry for selective coupling of the first receive port to the output of the first receive circuitry or the output of the second receive circuitry.

3. The circuit of claim 1, the first unidirectional CDR circuit further comprising:
   first circuitry configured to generate the recovered clock signal for use in generating the recovered data signal for output at the first transmit port of the first unidirectional CDR circuit, the recovered data signal being generated from the first received signal at the first receive port of the first unidirectional CDR circuit;
   second circuitry configured to detect first transitions in the received signal, detect second transitions in the recovered data signal, and generate one or more outputs based on a characteristic of the first transitions of the first received signal and a characteristic of the second transitions of the recovered data signal;
   third circuitry configured to detect a third transition in the recovered clock signal, detect a fourth transition in the first received signal, and generate one or more outputs that represent a relationship of the third and fourth transition; and
   fourth circuitry configured to transmit at least one of the one or more outputs of the second circuitry for use in controlling the first circuitry or to transmit one of the one or more outputs of the third circuitry for use in controlling the first circuitry.

4. The circuit of claim 1, further comprising:
   a third I/O port coupled to third transmit circuitry and third receive circuitry;
   a fourth I/O port coupled to fourth transmit circuitry and fourth receive circuitry;
   a second unidirectional CDR circuit comprising:
      a second receive port; and
      a second transmit port; and
   second multipath circuitry configured to selectively couple the second unidirectional CDR circuit to the third transmit circuitry and the third receive circuitry or the fourth transmit circuitry and the fourth receive circuitry.

5. The circuit of claim 4, further comprising:
   a matrix switch, wherein the first I/O port is coupled to a first port of the matrix switch and the third I/O port is coupled to a second port of the matrix switch, the matrix switch being controlled by the first multipath circuitry and/or the second multipath circuitry.

6. The circuit of claim 5, wherein the matrix switch includes a third port and a fourth port, and the first multipath circuitry and/or the second multipath circuitry are further configured to selectively couple the first transmit port of the first unidirectional CDR circuit to the third port of the matrix switch or the fourth port of the matrix switch, and to selectively couple the second transmit port of the second unidirectional CDR circuit to the third port of the matrix switch or the fourth port of the matrix switch.

7. The circuit of claim 1, wherein the first multipath circuitry is further configured to selectively couple the first unidirectional CDR circuit to the first transmit circuitry and the first receive circuitry or the second transmit circuitry and the second receive circuitry based on characteristics of one or more signals received from one or more transmitting devices.

8. The circuit of claim 4, wherein the first multipath circuitry is further configured to selectively couple the first unidirectional CDR circuit to the first transmit circuitry and the first receive circuitry or the second transmit circuitry and the second receive circuitry based on characteristics of one or more signals received from one or more transmitting devices; and
the second multipath circuitry is further configured to selectively couple the second unidirectional CDR circuit to the third transmit circuitry and the third receive circuitry or the fourth transmit circuitry and the fourth receive circuitry based on the characteristics of the one or more signals received from the one or more transmitting devices.

9. The circuit of claim 1, further comprising:
a third I/O port coupled to third transmit circuitry and third receive circuitry; and
the first multipath circuitry further configured to selectively couple the first unidirectional CDR circuit to the third transmit circuitry and the third receive circuitry.

10. The circuit of claim 9, wherein the first multipath circuitry is further configured to control the coupling of the first transmit port of the first unidirectional CDR to both the input of the first transmit circuitry and the input of the second transmit circuitry.

11. The circuit of claim 1, wherein the first multipath circuitry includes a multiplexer having digital logic gates configured for selective coupling of the first transmit port to the input of the first transmit circuitry or the input of the second transmit circuitry.

12. The circuit of claim 1, wherein the first receive circuitry includes an equalizer.

13. The circuit of claim 1, wherein the first multipath circuitry is further configured to set the first transmit circuitry and/or the first receive circuitry to a low-power state when data is being propagated using the second transmit circuitry and/or the second receive circuitry.

14. A half-duplex repeater circuit, comprising:
a first input/output (I/O) port coupled to first transmit circuitry and first receive circuitry;
a second I/O port coupled to second transmit circuitry and second receive circuitry;
a first unidirectional clock and data recovery (CDR) circuit comprising:
a first receive port configured to receive a first received signal conforming to a serial data protocol;
a first transmit port configured to transmit a recovered data signal generated from the first received signal using a recovered clock signal generated from the first received signal; and
first multipath circuitry configured to selectively couple the first unidirectional CDR circuit to the first transmit circuitry and the first receive circuitry or the second transmit circuitry and the second receive circuitry.

15. The circuit of claim 14, further comprising:
a third I/O port coupled to third transmit circuitry and third receive circuitry; and
the first multipath circuitry further configured to selectively couple the first unidirectional CDR circuit to the third transmit circuitry and the third receive circuitry.

16. The circuit of claim 14, wherein the first multipath circuitry includes a multiplexer having digital logic gates configured for selective coupling of the first transmit port to the input of the first transmit circuitry or the input of the second transmit circuitry.

17. The circuit of claim 14, wherein the first receive circuitry includes an equalizer.

18. The circuit of claim 14, wherein the first multipath circuitry is further configured to set the first transmit circuitry and/or the first receive circuitry to a low-power state when data is being propagated using the second transmit circuitry and/or the second receive circuitry.

19. The circuit of claim 15, wherein the first multipath circuitry is further configured to control the coupling of the first transmit port of the first unidirectional CDR to both the input of the first transmit circuitry and the input of the second transmit circuitry.

20. A circuit, comprising:
a first input/output (I/O) port coupled to first transmit circuitry and first receive circuitry;
a second I/O port coupled to second transmit circuitry and second receive circuitry;
a first unidirectional clock and data recovery (CDR) circuit comprising:
a first receive port configured to receive a first received signal conforming to a serial data protocol;
a first transmit port configured to transmit a data signal generated from the first received signal; and
first multipath circuitry configured to selectively couple the first unidirectional clock and data recovery (CDR) circuit to the first transmit circuitry and the first receive circuitry or the second transmit circuitry and the second receive circuitry.

21. The circuit of claim 20, the first unidirectional CDR circuit further comprising:
first circuitry configured to generate a recovered clock signal for use in generating the data signal for output at the first transmit port of the first unidirectional CDR circuit, the data signal being generated from the first received signal at the first receive port of the first unidirectional CDR circuit;
second circuitry configured to detect first transitions in the received signal, detect second transitions in the recovered data signal, and generate one or more outputs based on a characteristic of the first transitions of the first received signal and a characteristic of the second transitions of the recovered data signal;
third circuitry configured to detect a third transition in the recovered clock signal, detect a fourth transition in the first received signal, and generate one or more outputs that represent a relationship of the third and fourth transition; and
fourth circuitry configured to transmit at least one of the one or more outputs of the second circuitry for use in controlling the first circuitry or to transmit one of the one or more outputs of the third circuitry for use in controlling the first circuitry.

22. The circuit of claim 21, further comprising:
a third I/O port coupled to third transmit circuitry and third receive circuitry;
a fourth I/O port coupled to fourth transmit circuitry and fourth receive circuitry;
a second unidirectional CDR circuit comprising:
a second receive port;
a second transmit port;
second multipath circuitry configured to selectively couple the second unidirectional CDR circuit to the third transmit circuitry and the third receive circuitry or the fourth transmit circuitry and the fourth receive circuitry; and a matrix switch, wherein the first I/O port is coupled to a first port of the matrix switch and the third I/O port is coupled to a second port of the matrix switch, the matrix switch being controlled by the first control circuitry and/or the second control circuitry.

* * * * *